United States Patent [19]
Woodruff

[11] Patent Number: 5,628,879
[45] Date of Patent: May 13, 1997

[54] SUN ACTUATED AUTOMATED DISTILLATION APPARATUS

[76] Inventor: Seth D. Woodruff, 4411 Via Amable, San Diego, Calif. 92122-1520

[21] Appl. No.: 284,040

[22] Filed: Aug. 1, 1994

[51] Int. Cl.$^6$ ................................ B01D 3/00; C02F 1/14
[52] U.S. Cl. .................. 202/234; 159/903; 159/906; 159/DIG. 15; 159/DIG. 21; 202/267.1; 203/10; 203/86; 203/DIG. 1; 203/DIG. 17
[58] Field of Search ..................... 203/10, 1, 86, 203/2, DIG. 1, DIG. 17, DIG. 18; 202/234, 267.1, 160; 159/903, 906, DIG. 15, DIG. 21; 106/632

[56] References Cited

U.S. PATENT DOCUMENTS

| | | | |
|---|---|---|---|
| 3,174,915 | 3/1965 | Edlin | 202/234 |
| 3,336,206 | 8/1967 | Sasaki et al. | 202/234 |
| 3,359,183 | 12/1967 | Kenk | 203/10 |
| 3,501,381 | 3/1970 | Delano | 203/10 |
| 3,540,479 | 11/1970 | Thompson | 137/625.5 |
| 3,655,517 | 4/1972 | Hensley et al. | 202/234 |
| 3,846,251 | 11/1974 | Hay | 202/234 |
| 4,055,473 | 10/1977 | Hay | 202/234 |
| 4,135,985 | 1/1979 | La Rocca | 203/10 |
| 4,172,767 | 10/1979 | Sear | 203/10 |
| 4,227,970 | 10/1980 | Howell et al. | 202/234 |
| 4,420,375 | 12/1983 | Husson | 202/234 |
| 4,606,794 | 8/1986 | Wyckoff | 202/173 |
| 4,966,655 | 10/1990 | Wilkerson | 202/234 |
| 5,316,626 | 5/1994 | Guy | 203/DIG. 1 |

FOREIGN PATENT DOCUMENTS 2434120   4/1980   France ................. 203/DIG. 17

OTHER PUBLICATIONS

Löf, Geo. O.G., "Demineralization of Saline Water with Solar Energy", R & D Report No. 4, Aug. 1954, pp. 64–67.
Telkes, Maria, "New & Improved Methods of Solar Distillation," R & D Report No. 31, Aug. 1959, pp. 3–5.
Erb, Rob't A., "Producing Permanently Hydrophilic Surfaces on Plastic Film for Solar Stills," R & D Report No. 29, pp. 1–27, Sep. 1959.
Lawand, T.A., "Systems for Solar Distillation" Report No. R 115, Sep. 1975, Brace Research Institute, p. 5.

Primary Examiner—Virginia Manoharan

[57] ABSTRACT

A portable solar still, controlled by a sun actuated mechanical valve, including a thermally insulated evaporation chamber structure within which distillation takes place, is assembled from sidewall panels and floor panels of foam plastic thermal insulation, these panels being strengthened and made into rigid structural units by metal tubes or rods incorporated internally into the foam plastic panels, a transparent cover sealing the sloping top of the evaporation chamber including a transparent, flexible, plastic film which is stretched across, and has its four boundary edges attached to, the four members of a closed rectangular frame of slender metal tubes, wick matting, disposed on the floor of the evaporation chamber including a layered mat of fine, randomly oriented, glass fibers, said wick matting being impregnated with a black, hydrophylic, mixture to provide maximum absorbency of saline water and of solar heat energy, an adjustable, mechanical, sun actuated saline water flow control valve regulates the rate of saline feedwater inflow into the evaporation chamber.

3 Claims, 3 Drawing Sheets

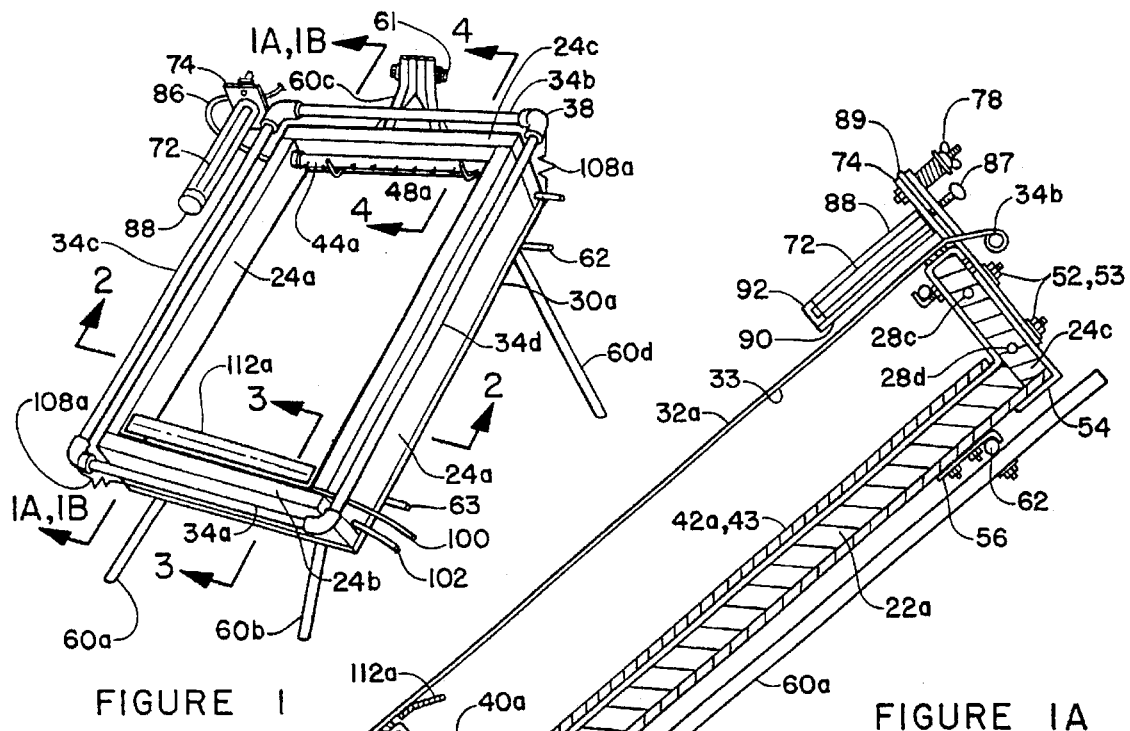

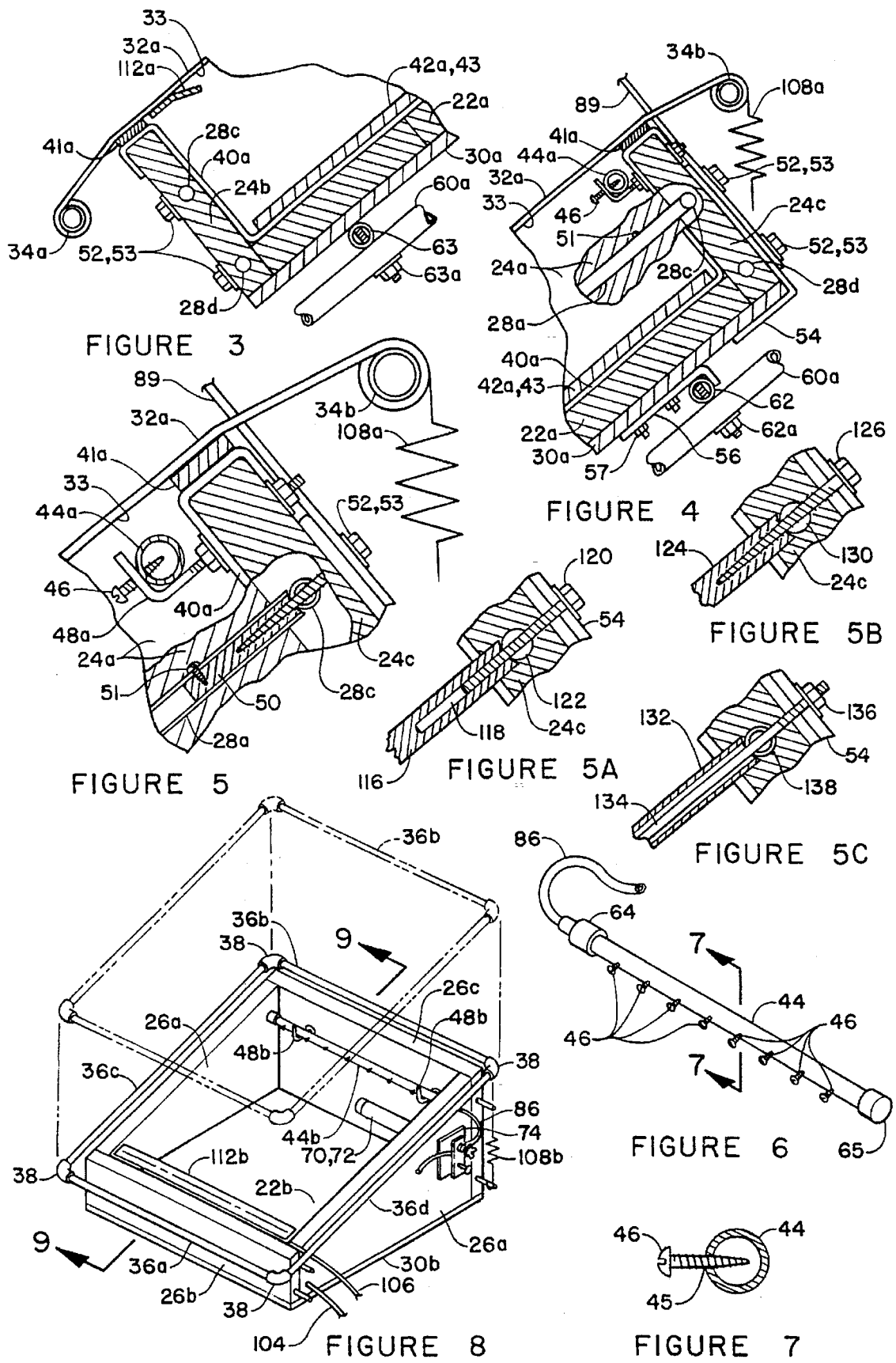

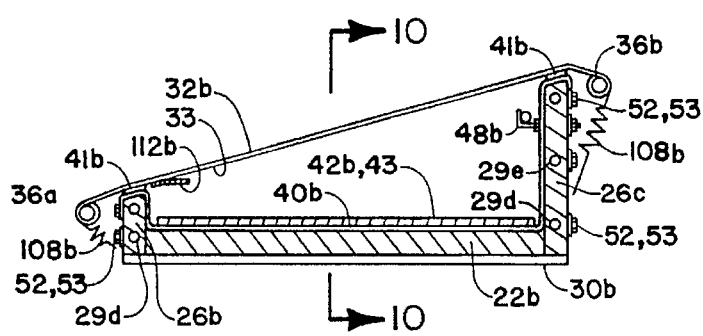
FIGURE 9
FIGURE 11
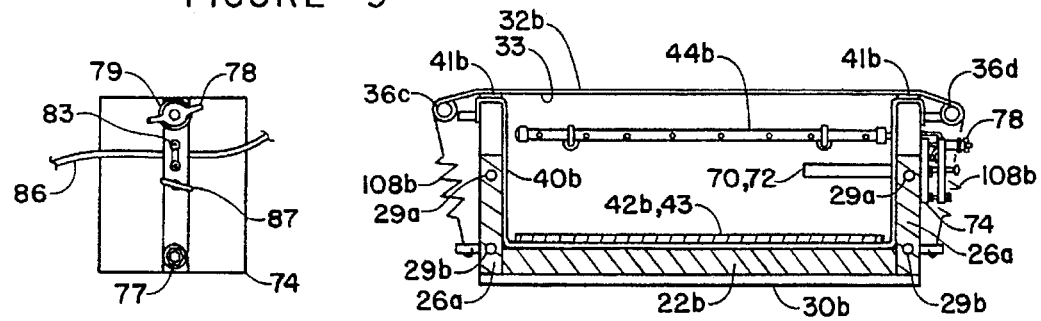
FIGURE 10
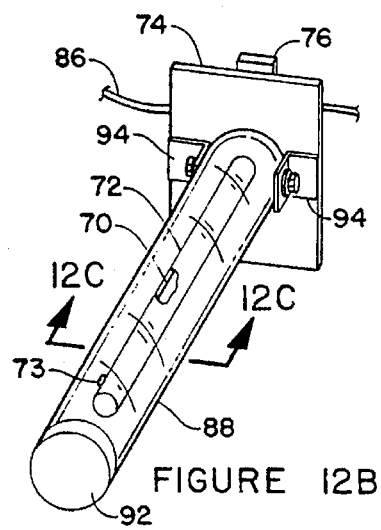
FIGURE 12A
FIGURE 12B
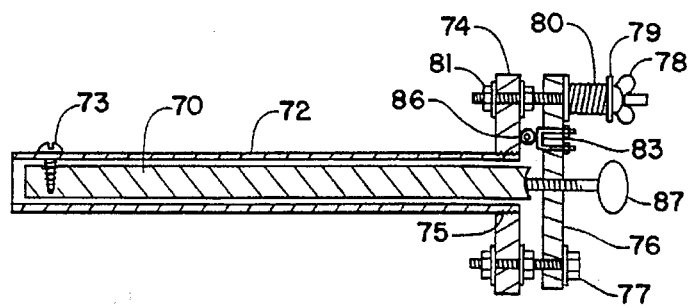
FIGURE 12
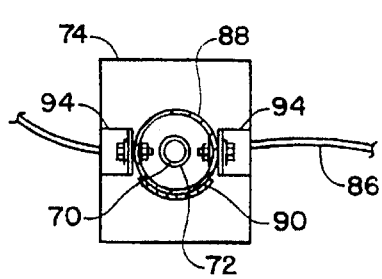
FIGURE 12C
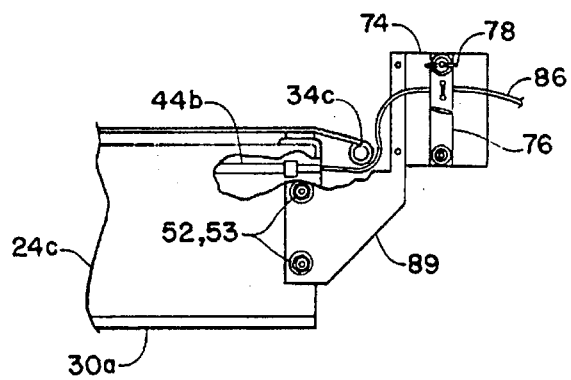
FIGURE 13

SUN ACTUATED AUTOMATED DISTILLATION APPARATUS

BACKGROUND - FIELD OF INVENTION

This invention relates to an apparatus which utilizes the thermal energy in sunlight to produce fresh water from brackish or saline water.

BACKGROUND - HISTORY OF THE DEVELOPMENT OF SOLAR DISTILLATION

A solar still utilizes sunlight, converted to heat, to distill water. The basic apparatus is a boxlike evaporation chamber with a tight fitting transparent cover. Sunlight passing through the transparent cover heats and vaporizes the saline water in the bottom of the chamber. The water vapor condenses on the undersurface of the sloping transparent cover and trickles down the undersurface to an intercepting trough whence it is conducted to a container outside of the still.

U.S. Pat. No. 102,633, for a solar still designed to separate alcohol from water, was issued in 1870. It was a tilted tray type of still with a series of level transverse troughs, arranged like stair steps, on the sloping still bottom to retain the liquid in the evaporation chamber until it could be heated and vaporized.

The first large solar still for fresh water production was built in 1872 in a remote area of the Chilean desert. This installation, at Las Salinas, was designed and built by a mining engineer, Mr. Carlos Wilson, and produced fresh water for men and their mules working at a mining operation. The installation consisted of a series of basin-type stills with shallow wooden salt water basins placed on the ground. These were enclosed by wooden walls and by sloping glass roofs covering the tops of the basins.

The installation had an evaporation area of about 4,460 square meters (48,000 square feet) and, when it was new, produced about 22,000 liters (5,800 gallons) of fresh water a day from brackish water. This solar distillation plant was unique because there was not another such plant built anywhere in the world until 90 years later, in the 1960's. In fact, there does not appear to have been any significant research into solar distillation until the 1940's, when the armed forces of the United States became interested in developing small inflatable solar stills which could be carried as emergency equipment on aircraft. These stills were intended to produce drinking water from sea water in emergency situations.

Following World War II there was a surge of interest in large scale solar distillation. The governments of countries which possessed large areas of arid land wherein there were located bodies of brackish water, or where seawater was available, became interested in the possibilities of large scale solar distillation.

Research institutions in many countries participated in studying the subject. T. A. Lawand, in 1975, listed twelve countries in which large solar stills had been built by the end of the 1960's.

These activities seemed to culminate near the end of the 1960's and the construction of large solar stills declined thereafter.

Stills constructed during the 1960's had a broad range of sizes. Generally, the evaporation areas ranged from about 200 square meters (2,200 square feet) to about 2,500 square meters (27,000 square feet), but a number of large stills were built. The largest, on the Greek island of Patmos, had an area of about 8,600 square meters (about 93,000 square feet).

As a rule of thumb for basin stills, one square meter of evaporation area will produce from 3 to 5 liters of distillate per day, depending on the latitude and the season of the year. Those located in a desert near the equator would, of course, be the most productive. All the large stills constructed during the 1960's were constructed as basin type stills.

Interest in large scale solar distillation declined after the end of the 1960's, probably because other, competing methods, for desalination of sea water were being improved and their costs were being reduced.

The reverse osmosis (RO) process was maturing, and stem distillation processing using fossil fuels was becoming more efficient as multiple stages were added to their heat recovery systems. Communities which required large quantities of potable water could obtain it more cheaply from large RO or steam distillation plants than from solar distillation plants. These economic factors probably account for the general abandonment of large scale solar distillation projects.

BACKGROUND - PRIOR ART

The mount of solar energy which strikes any given area of the earth's surface is limited. The mount available varies with the latitude and with the seasons. It is greater near the equator and less in northern latitudes. As an example, a solar still located in the Southern California area would, on an average day (based on an annual average), intercept solar energy equivalent to about six kilowatt hours per square meter (about 1,900 Btu per square foot). Heat energy equivalent to about 0.65 kilowatt hours is required to evaporate one liter of water (2,100 Btu per quart). It would appear that the mount of solar energy which impinges on one square meter of a still's surface should evaporate about 9 liters (about 8.5 quarts) of water. Because of heat losses and miscellaneous vapor leaks, however, most large solar stills produce from 3 to 4 liters of distillate per square meter of still area per day (3 to 4 quarts per 10 square feet). Unless maintenance is very good, the production rate of a large solar still will decline slowly as it ages and develops leaks.

Solar energy losses occur both before and after sunlight enters the still. Some sunlight is reflected from the cover and some of that converted to heat inside the evaporation chamber is radiated back through the cover. Heat is lost by radiation and conduction through the bottom, sides and ends of the evaporation chamber. Thermal insulation is needed in order to retain heat in the chamber for the maximum evaporation effect and maximum still efficiency. In addition, the color of the wick matting (absorber/evaporator matting) in the bottom of the evaporation chamber affects efficiency. A light colored matting surface reflects solar energy out through the cover, while a black surface absorbs sunlight and converts it into heat.

Operating conditions for solar stills are very severe. The continuous processing of hot brine for periods of years creates one of the most difficult corrosion problems in existence. The sun's ultra violet (UV) rays also have a significant deteriorating effect on any organic materials used in solar still construction.

Internal temperatures also contribute to deterioration of materials used inside the still. Operating temperatures in a producing tilted still often reach 85° C. (185° F.) and, when the still goes dry, as it occasionally will due to interrupted water supply or other malfunction, the temperature may reach 135° C. (275° F.). Such temperatures immediately destroy some types of plastics, such as polystyrene foam, and cause softening and/or deformation of other types of plastics.

High temperatures, together with corrosive conditions, severely limit the types of materials which can be used inside an evaporation chamber and materials must be selected for temperature resistance as well as corrosion resistance.

Types of Solar Stills

The basin type still and the tilted type still are the preferred types for normal production usage.

The basin type still has a relatively deep, boxlike, solar heated evaporation chamber with a horizontal bottom pan which holds the saline water. The transparent cover is sloped so that condensed distillate drains down the undersurface of the cover to a catchment trough. The depth of saline water in the bottom of a basin still is kept as shallow as possible because a thin layer of water heats more quickly and distillation begins sooner.

A layer of black, water absorbent, matting may be placed in the bottom of the pan to absorb solar energy and to provide a surface for evaporation. In this case the water in the bottom pan should be maintained at a level just enough to saturate the wick matting, but not to submerge it. Distillation proceeds at a usable rate when the saline water reaches a temperature about 10° to 15° C. above the ambient air temperature.

A basin still produces efficiently during the summer months when the sun is high in the sky, but during the winter months, when the sun is low, the rate of distillate production decreases to about one-half the summer rate. In the tropics, where the sun is high in the sky all year round, the rate of production remains fairly constant.

The tilted type still has a shallow boxlike or panlike solar heated evaporation chamber and is provided with an adjustable support at the upper end which allows the slope of the still to be changed with the seasons so that the evaporation surface faces the sun at midday and receives the maximum amount of solar energy.

Since the still is tilted, the saline water fed into the upper end must be retained on the slope long enough to be heated by the sun and evaporated.

Tilted Wick Still

The tilted wick still utilizes a layer of black, fibrous, water absorbent matting on the floor of the still pan. The saline feedwater drips onto the upper end of this wick matting and spreads across and down the surface of the wick matting in a thin layer so that it is quickly vaporized. The tilted wick still makes the most efficient use of any available solar energy and is the most productive type of still.

Tilted Tray Still

In the tilted tray still, water is retained on the slope in a series of shallow transverse pans or trays (like stair steps) on the inclined floor of the still. These trays retain the water until it can be heated. Trays have customarily been fabricated of sheet steel or sheet aluminum and coated with various types of protective coatings against corrosion by saline water.

U.S. Pat. No. 4,420,375, to Husson (1983), describes a tilted tray type still with a plurality of angled water trays of extruded plastic.

State of the Art

Basin Stills

In the previous practice of the art, basin stills have customarily been built of redwood lumber, marine plywood, window glass in wood or metal frames, saline water basins lined with plastic sheet or rubber and, if thermal insulation was used, it would be enclosed between double wooden walls.

A large basin still is a cumbersome structure. It is firmly fixed on concrete foundations and includes a water basin in, or on, the ground, and an evaporation chamber covered with panes of glass. A basin still requires flushing to remove evaporative salt deposits and/or algae growth.

Attempts have been made to utilize modern materials to fabricate smaller basin type stills which are less cumbersome and easier to access for maintenance purposes.

U.S. Pat. No. 3,655,517, to Hensley and Young (1972), describes a solar still with an evaporation chamber which is to be pressure molded, as a unit, from foam plastic material. The patent does not provide for any stiffening or reinforcing means for the large unsupported foam plastic surfaces which constitute the walls and bottom of the evaporation chamber and which are exposed to the internal heat of the chamber. Under such conditions, unsupported foam plastic surfaces warp and deform unless some substantial confining or reinforcing means is provided.

Tilted type stills require thermal insulation on the floor and the four walls of the evaporation chamber in order to conserve heat internally and, in the prior art, insulation of the chamber has commonly been accomplished by building a double walled "box" and installing the insulation between the walls.

Insulation of the evaporation chamber as typically practiced in the prior art is conveniently indicated in drawings for U.S. Pat. No. 4,227,970, to Howell and Settle (1980), in which the thermal insulation is typically confined between double walls of "high strength housing." This has been the conventional practice in the prior art; that is, installing the insulation between two protective rigid planar members.

Transparent Cover for Evaporation Chamber

The sloping transparent cover on the evaporation chamber is the most important element in a solar distillation apparatus. It allows sunlight to enter the evaporation chamber and it retains heat and water vapor within the chamber. Water vapor condenses on the undersurface of the cover and trickles down the undersurface to a collection trough, whence it is conducted to a distillate container outside the still.

The linear surfaces where the undersurface of the transparent still cover contacts the planar top surfaces of the walls enclosing the evaporation chamber are the locations which are the most difficult to seal effectively, and the locations where most vapor leaks develop. For this reason, the practice in the prior art has been to secure transparent still covers rigidly in place by semi-permanent or permanent means to assure that the cover will not shift and allow vapor leaks to develop.

In the previous practice of the art, transparent still covers have been made of panes of glass caulked into wooden or metal frames. Transparent flexible plastic (synthetic polymer) cover films have also been used and their edges have usually been secured to the evaporating chamber by battens, splines, or other types of permanent fasteners. Other means for fastening still covers in place have included some rather cumbersome slideable mechanical devices. Two such mechanical fastening devices are described in U.S. Pat. No. 3,846,251, to Hay (1974), and U.S. Pat. No. 4,055,473, to Hay (1977).

The types of devices used to secure transparent covers on evaporating chambers have made it difficult and time consuming to gain access to evaporation chambers for cleaning or adjustment purposes.

U.S. Pat. No. 4,966,655, to Wilkerson (1990), describes a flexible thin film cover for a basin type still which is fixed in place and supported by an open wire frame. The edges of the flexible thin film cover are said to be secured in place by strips of wood, metal, etc., fastened by screws. Thus, the cover is not easily removable.

Many different types of plastic film or sheet have been used as covers for solar stills. The types which have been used in the practice of the art include the following:

polyethylene (PE), polyvinylchloride (PVC), polyester (Mylar), polycarbonate (PC), polyvinylfluoride (PVF), fluorinated ethylene-propylene (FEP), an acrylic/ polyester composite sheet, and a PVF clad fiberglass sheet.

These transparent films have most often been used in thicknesses of 75 microns (0.003 inch) to 250 microns (0.010 inch). The longest service life is provided by the fluorinated polymer films PVF and FEP, because they are more resistant to ultra violet rays and to the heat of the still.

Hydrophobic (Non-Wettable) surfaces on Plastic Still Covers

The surfaces of plastic (synthetic polymer) films and sheets are normally hydrophobic (water repellant). As a result, water vapor condenses on the undersurface of a plastic still cover in the form of a multitude of tiny spherical droplets which give the plastic film a foggy or frosty appearance. Such a surface reflects as much as 50% of the incident sunlight and reduces the production of the still accordingly.

This phenomenon has been a major obstacle to the use of transparent plastic films as covers for solar stills. In the past, a number of researchers have directed efforts to finding methods of creating permanently wettable surfaces on plastic, and some have had partial success.

U.S. Pat. No. 3,336,206, to Sasaki, et al (1967), describes a method which involves treating the plastic surface with sulfuric acid, followed by treatment with a strong oxidizing agent. It is noted the process was successfully applied to polyvinylchoride, polystyrene and acrylic sheet. However, the process is not applicable to the fluorinated polymers, which are the most useful thin films because of their long service lives.

Robert A. Erb, in 1959, described two methods which were investigated for producing hydrophylic surfaces on plastic surfaces.

One method involved the vacuum deposition of silicon monoxide on the plastic surface and the other method involved the chemical deposition of titanium dioxide on the surface. Both methods produced hydrophylic surfaces and the TiO2 treated sample was tested for seven months (by submersion) without losing its wettability.

From the descriptions of the experiments it is evident that these treatments require costly processing equipment and exacting process controls which would add greatly to the cost of any plastic film so treated. There is no indication, in the available technical literature, that the films so processed were ever given adequate field tests under actual operating conditions. When plastic films are surface treated, a major concern is whether or not long term exposure to ultra violet rays will cause discoloration and darkening of the film. Only actual field tests are adequate to determine this factor.

U.S. Pat. No. 3,174,915, to Edlin (1965), includes a discussion of the various possible methods of creating hydrophylic surfaces on plastic film by roughening the surfaces. Possible methods mentioned include impregnating the surfaces with colloidal silica, sanding with sandpaper, or calendering during the manufacturing process. It is suggested that a calendered surface have about 200 grooves per inch.

While surface roughening methods may indeed make the film more wettable, one experimenter has reported a very significant reduction in the service life of a plastic film solar still cover which was roughened with sandpaper.

Automatic Water Control Valves for Solar Stills

In the prior practice of the art, automatic valves used to control water flow to solar stills have been float valves. A float valve is a mechanical valve actuated by a float which rides on the water surface and permits water to enter when the water level in the reservoir falls below a certain level. This type of valve has been used to control water levels in basin stills, but is not satisfactory for tilted type stills.

U.S. Pat. No. 4,606,794, to Wyckoff (1986), records an attempt to create an automatic water control valve operated solely by solar energy. The patent describes a "valve" which consists of a wax inclusion inserted into a water conduit situated within a solar heated still chamber, or within a solar heated panel attached to the still chamber.

The wax inclusion is located at the top of an inverted "U" bend in the water conduit because the wax floats on the water and is trapped at the top of the "U" bend. The wax is said to melt and allow saline water to flow into the the "U" bend. The wax is said to melt and allow saline water to flow into the still when the still temperature and the water temperature reach a desired point, and the wax is said to solidify at the top of the "U" and stop water flow into the still when the temperature cools to the appropriate point.

The idea is certainly novel; however, the fact that the wax must be trapped at a high point in the water conduit creates a problem. High points in a water conduit are also the locations to which stray bubbles of free air migrate and are trapped, and when a large air bubble accumulates at the top of the inverted "U" it prevents the solidifying wax from closing the conduit. If an air "bleeder" is installed at the high point to bleed off the trapped air, the melted wax also enters the bleeder and clogs the system.

Another observation relating to this type of valve pertains to the fact that, as the wax cools, it solidifies in concentric layers, first against the periphery of the inner wall of the conduit, and then progressively inward to the center until there is a small hole left in the center of the "plug", which remains unclosed.

Wick Matting (Absorber/Evaporator Matting)

In the practice of the prior art, fabrics of fibrous materials, either natural fibers (plant fibers), or synthetic polymer fibers, have been used for wick matting ever since research into solar distillation began in the 1940's.

Previously used fibrous materials have had four serious deficiencies: (1) Absorptive capacity is inadequate. The most common problem with common fibrous fabrics is that they are not absorptive enough and do not give a uniformly wet surface for evaporation, but have many dry areas. (2) The original black color of the fabric fades under the impact of ultra violet rays to a light color which reflects solar energy rather than absorbing it. (3) Sustained chemical attack by hot salt water on the fibrous fabrics of the wick matting causes it to lose its cohesiveness, to ravel, and eventually to disintegrate. (4) Each type of natural fiber, and each type of synthetic polymer fiber, has its own characteristic odor. This odor may not be noticeable when the material is dry, but becomes evident when the material is saturated with hot brine. The synthetic polymer fabrics have the most distinct odors.

The distillate is never in contact with the hot saline water or the wick matting, but it does absorb an odor characteristic of the material in the wick matting, and this odor is identifiable as a taste in the distillate. The strength of the taste decreases with time as the still operates, but may persist for weeks or months before it decreases to acceptable levels. In the meantime, if the taste is objectionable, It may be removed by passing the distillate through activated carbon filters.

Wick matting is constantly subjected to severe corrosive conditions. Hot saline water at temperatures up to 85° C. (185° F.) saturates the matting continuously and the chemicals in the saline water are destructive to the fibers in the wick matting. In addition, ultra violet rays bleach out any dark organic dyes applied to the fibrous matting.

George O. G. Löf, in 1954, discussed problems encountered in the development of solar stills and noted the problem of obtaining uniform diffusion of saline water through the wick matting as well as the difficulty of achieving a satisfactory fabric (wick matting) life due to decay of the fabric.

Maria Telkes, in 1959, described her experiments with tilted wick stills in which she used wick matting made of sponge cloth and also fabrics made of natural fibrous materials, principally cotton terrycloth. She commented on the problems with fading of black dyed materials and also the lack of adequate absorbency (wettability) and the development of dry areas in wick matting comprised of these materials.

Telkes also experimented with fabrics comprised of rayons and acetates. These materials are chemically modified reconstituted natural fibers and do not possess the durability of synthetic polymer fibers, however they are hydrophylic, whereas the synthetic polymer fibers are hydrophobic. Telkes recommended a black, dope dyed acetate.

The present Inventor has determined experimentally that rayons, acetates, and triacetates do indeed possess excellent water absorbent capacities, but are not chemically stable when subjected to a flow of hot saline water and, when used in a tilted wick still, deteriorate and disintegrate physically after a few months of service.

Other researchers, following Telkes's work, have used a variety of fibrous materials for wick matting, including burlap, corduroy, cellulose sponge, sailcloth, polyethylene felt, seagrass matting and maize matting.

Natural fibers tend to have good absorbency, but they deteriorate quickly in tilted wick stills and do not have long service lives, while fibers of synthetic polymers are more resistant to chemical attack by hot saline water, but they do not possess any natural absorbency.

The problems noted above, pertaining to fibrous materials used for wick matting in the previous practice of the art, have discouraged commercial development of tilted wick stills.

Other Types of Stills

The preceding discussion has covered basin stills, tilted wick stills and tilted tray stills. Some of the other types which researchers have built and operated include basin stills with an air-inflated transparent flexible plastic film cover which was anchored to concrete curbs beside the saline water basins and pressurized by a small air blower so that the plastic film covers formed arches over the basins. This type of still was tested on a large scale, but is no longer in use.

Vertical stills have been built with absorbent wicks hanging vertically and enclosed in transparent plastic envelopes. Since the wicks were vertical, the stills operated best when the sun was low in the sky. With this type of still, there are large areas exposed to the wind, and resultant problems with stability.

Researchers have, in the past, built and tested a variety of multiple effect stills. A multiple effect still recaptures the heat given off when water vapor condenses and returns it to a second stage evaporator where it assists in evaporating the second stage of saline water, and when the second stage vapor condenses, the heat is recaptured and assists in evaporating a third stage, etc, etc. While multiple effect solar stills are more efficient and productive, they are also more complicated and costly to construct and extra work is required to keep them clean and in adjustment. They are not considered practical for everyday use.

Of the many different types of solar stills which have been built and tested during the past 50 years, two types, basin stills and tilted stills, are considered to be the most practical for everyday use.

In addition to the many types of saline water distillation devices described in technical publications, the patent literature describes many novel designs for solar distillation devices. Few of these have any chance of development for practical use because elaborate designs requiring expensive materials result in construction costs which are excessive relative to their limited potential for producing any significant quantities of distilled water.

Objects and Advantages of the Present Invention

An object of my sun actuated, automated distillation apparatus is to provide a solar still which extracts the maximum energy from sunlight and utilizes it for producing the maximum amount of distilled water.

Another object is to provide a still which can be easily assembled and as easily disassembled for portability. The reinforced insulated wall panels enclosing the evaporation chamber are assembled by installing two fastening screws in each corner of the chamber "box" and are disassembled by removing the screws.

Another object is to provide a light weight still which can be easily moved. The body assembly of my tilted wick still, with an evaporation area of one square meter, (10.8 square feet) weighs less than 25 kilograms (about 55 pounds) and the frame and cover for the evaporation chamber weighs less than 5 kilograms (about 11 pounds).

Another object is to provide a transparent cover which can be removed and replaced easily and quickly for easy access to the interior of the chamber for cleaning or adjustment. This cover can be removed in less than a minute simply by unhooking the four elastic, corner, "hold down" members, and can be replaced just as quickly.

The still operates automatically; that is, it operates for extended periods of time without requiring human attention. Automatic operation is facilitated by a solar actuated mechanical water control valve which allows saline water to flow through the still only when there is sufficient sunlight to carry out the distillation process.

The valve conserves the supply of raw water which would be wasted if it flowed continuously at night and during cloudy weather. The solar actuated valve functions by mechanical means and no electrical connections are required. No power input other than solar energy is required for operation of the still.

When my invention is connected to a source which provides a continuous supply of saline feedwater, it will operate for extended periods of time without requiring any attention and will produce a daily portion of potable water which can be allowed to accumulate in a storage tank.

For example, the solar still can be connected to a farm water supply to remove minerals from "hard" well water in order to provide a daily portion of potable water for cooking and drinking.

This solar still can also be connected to a water line served by a city water system in order to provide a daily portion of demineralized water by removing the 300 to 500 parts per million of dissolved minerals which are found in many city water supply systems.

Saline water, such as sea water, or brackish water, is not normally available as a continuous supply from a pipe or a storage tank system, and provision must be made to pump, or carry, water from such sources to storage tanks from which stills can be supplied by gravity flow. An installation on a small Caribbean island utilized a small windmill to pump seawater to storage tanks to supply solar stills.

My solar still is made from metals and plastics combined in new and novel ways to fully utilize the unique qualifies of each material, and is constructed with minimum quantities of materials.

The materials of construction are selected for long service lives to resist the corrosive effects of hot salt water, the destructive effects of high still temperatures, and the deteriorating effects of ultra violet rays.

Summary of New and Novel Features of Sun Actuated Automated Distillation Apparatus My sun actuated automatic still encompasses a number of new and novel individual features, each of which is an improvement on the prior practice of the art. These new and novel features, when combined, comprise the Sun Actuated Automated Distillation Apparatus.

My automatic still is intended to provide solar distillation means which will supplant those constructed by traditional methods with traditional materials; that is, 2×4's, redwood lumber, marine plywood, window glass with wooden frames, insulation placed within double walls of wood or metal, and foundations of concrete.

My invention includes eight main features or elements which, in the preferred embodiment, comprise:

1. A boxlike evaporation chamber wherein the reinforced wall panels of the present invention are comprised of panels of rigid plastic foam thermal insulation stiffened by means of tubular metal reinforcement members incorporated internally in the panels.

The internal reinforcement maintains the wall panels as flat, planar, members; whereas, without reinforcement, they would warp when exposed to the heat of the evaporation chamber.

The reinforcement also creates rigid structural panel units which can be incorporated into the chamber structure without requiring external support or containing walls.

The perimeter wall panels enclose a floor of thermal insulation material which completely covers the floor area within the perimeter walls of the chamber. The floor and the walls of the chamber are supported on a substantially rigid, flat, support base.

2. An imperious flexible sheet for lining the interior of the floor and walls of the evaporation chamber comprises, in the present invention, alternate layers of film, or plastic sheet, and metal foil, to which adhesive is applied so that the layers bond together and form a single composite sheet which is impervious to saline water and water vapor.

3. The sloping transparent evaporation chamber cover, of the present invention, comprises a sheet of transparent flexible plastic film which is attached to, and stretched across, an open rectangular frame comprised of tubular metallic members held in a rectangular configuration by sockets in rigid corner elbows. The tubular metallic members may be individually rotated about their long axes to adjust the tension in the plastic cover film to compensate for temperature or wind effects. The assembled cover is held down and in position on top of the evaporation chamber, by the tensional pull of elastic members attached at each corner of the cover frame, and a sealed linear join surface is created where the undersurface of the plastic cover film contacts and compresses strips of flexible plastic foam gasket material bonded to the planar top surfaces of the walls enclosing the evaporation chamber.

The cover film is held in tight contact with the compressible plastic foam gasket by the tensional pull of the elastic members, but the cover is easily removed by unhooking the elastic members attached at the four corners.

4. The fluid hydrophylic mixture, of the present invention, is applied to the undersurface of the transparent cover film to render it wettable and to maintain a thin transparent layer of condensed distillate on the undersurface which prevents fogging of the cover.

5. A sun actuated mechanical water valve, of the present invention, conserves the saline feedwater supply by controlling the flow of saline feedwater into the evaporation chamber. This valve allows saline water to flow when the sun shines and stops the saline water flow when the sun ceases to shine.

6. Wick matting (absorber/evaporator matting) is a fibrous matting which covers the floor of the evaporation chamber, absorbs saline feedwater as it enters the evaporation chamber, spreads it in a thin layer, and provides a black, heat absorbing surface from which evaporation takes place. The wick matting, of the present invention, is comprised of a layered mat of fine, randomly oriented glass fibers which resist chemical attack by hot salt water and are not affected by the internal heat of the still.

In the prior practice of the art, fabrics made of natural fibers (plant fibers) or of synthetic polymer fibers, have been used as wick matting. These fabrics generally do not have adequate absorbency to spread the saline water, they fade quickly from dark to light colors, and usually have relatively short service lives. In addition, many of them have, when wet, distinctive odors which are absorbed by, and flavor, the distillate.

7. A black, fluid hydrophylic mixture, of the present invention, is applied to the wick matting to give it a permanent black color and to improve its absorption.

8. The present invention discloses a saline water distribution conduit with adjustable drip ports which is installed in the upper portion of the still to apportion the inflowing water evenly across the width of the evaporation chamber.

BRIEF DESCRIPTION OF THE DRAWINGS

In the drawings, closely related figures are assigned the same numbers but different alphabetic suffixes.

FIG. 1 shows a perspective view of an assembled tilted wick still.

FIG. 1A shows a cross-sectional view of the still of FIG. 1.

FIG. 1B shows a cross-sectional view of a tilted tray still.

FIG. 2 shows a cross section through the still of FIG. 1, looking from the lower end toward the upper end.

FIG. 3 shows an enlarged detailed cross section through the lower end of the still of FIG. 1.

FIG. 4 shows an enlarged detailed cross section through the upper end of the still of FIG. 1.

FIG. 5 shows an enlarged portion of the cross section of FIG. 4 showing details of the reinforcement connections at the corners of the evaporation chamber.

FIG. 5A shows an alternate type of reinforcement using solid metal rods.

FIG. 5B shows an alternate type of wall reinforcement using rodlike members comprised of wood, or of fiberglass reinforced plastic (FRP).

FIG. 5C shows an alternate type of wall reinforcement using metal tubes through which are run tie rods threaded at each end to tie the evaporation chamber structure into a rigid box.

FIG. 6 shows the saline water inflow distribution conduit with adjustable drip ports.

FIG. 7 shows an enlarged cross section of FIG. 6.

FIG. 8 shows a perspective view of an assembled basin still and a projected view of the frame and cover for the evaporation chamber.

FIG. 9 shows a cross section of the basin still of FIG. 8.

FIG. 10 shows a cross section of the basin still of FIG. 8 taken looking from the front (lower) wall toward the rear (higher) wall.

FIG. 11 shows details of the corner elbow connectors for the tubular members comprising the frame on which the transparent plastic cover film is stretched.

FIG. 12 shows a cross section taken longitudinally through the sun actuated saline water control valve.

FIG. 12A shows an end view of FIG. 12, the sun actuated valve.

FIG. 12B shows a perspective view of an alternate embodiment of the sun actuated valve of FIG. 12.

FIG. 12C shows a cross section of the embodiment shown in FIG. 12B.

FIG. 13 shows the mounting bracket which holds the sun actuated valve to the body of the still.

REFERENCE NUMERALS FOR DRAWINGS
FIG. 1 TO FIG. 13

Typical embodiments of my solar actuated automatic still are shown by FIG. 1, a perspective view of an assembled tilted wick still, and FIG. 8, a perspective view of an assembled basin still.

In the descriptions of the numbered parts which follow, it should be noted that two types of stills are included: the tilted still, FIG. 1, 1A, 1B; and the basin still, FIG. 8. The components of both stills are similar in composition and usage but some have different configurations. When components are the same size, they are interchangeable between stills. For example, the transparent covers for the evaporation chambers can be interchanged, floor panel insulation can be interchanged, and the same applies to the solar actuated flow control valve, wick matting, saline water inflow distribution conduits, etc.

In the following lists, parts are grouped together by numbers based on the similarities and uses, rather than listing all parts for the tilted still in one list and all parts for the basin still in another.

Reference Numerals in Drawings
22a Floor insulation for the tilted still, FIG. 1, FIG. 1A, FIG. 1B.
22b Floor insulation for the basin still, FIG. 8, FIG. 9, FIG. 10.
24a Evaporation chamber sidewalls, tilted still.
24b Lower end wall of evaporation chamber, tilted still.
24c Upper end wall of evaporation chamber, tilted still.
26a Evaporation chamber sidewalls, basin still.
26b Front wall of evaporation chamber, basin still.
26c Back wall of evaporation chamber, basin still.
28a Upper tubular metal reinforcement member for sidewalls, tilted still.
28b Lower tubular metal reinforcement member for sidewalls, tilted still.
28c Upper tubular metal reinforcement member for endwalls, tilted still.
28d Lower tubular metal reinforcement member for endwalls, tilted still.
29a Upper tubular metal reinforcement member for sidewalls, basin still.
29b Lower tubular metal reinforcement member for sidewalls, basin still.
29c Upper tubular metal reinforcement member for endwalls, basin still.
29d Lower tubular metal reinforcement member for endwalls, basin still,
29e Middle tubular metal reinforcement member for rear endwall, basin still.
30a Flat support base for evaporation chamber, tilted still.
30b Flat support base for evaporation chamber, basin still.
32a Transparent flexible plastic cover film, tilted still.
32b Transparent flexible plastic cover film, basin still.
33 Hydrophylic coating for plastic cover film.
34a Lower member of cover frame, tilted still.
34b Upper member of cover frame, tilted still.
34c Left side member of cover frame, tilted still.
34d Right side member of cover frame, tilted still.
36a Lower member of cover frame, basin still.
36b Upper member of cover frame, basin still.
36c Left side member of cover frame, basin still.
36d Right side member of cover frame, basin still.
37 Holes for insertion of lever means for rotating the tubular frame members.
38 Corner elbows for the cover frames. All corner elbows are identical. (FIG. 11)
39 Set screws (machine screws) for the corner elbows.
40a Impervious composite sheet lining for evaporation chamber, tilted still.
40b Impervious composite sheet lining for evaporation chamber, basin still.
41a Gasket of compressible plastic foam, tilted still.
41b Gasket of compressible plastic foam, basin still.
42a Wick matting (absorber/evaporator matting), tilted still.
42b Wick matting (absorber/evaporator matting), basin still.
43 Black, hydrophylic mixture applied to wick matting.
44a Saline water inflow distribution conduit with adjustable drip ports, tilted still. (FIG. 6)
44b Saline water inflow distribution conduit with adjustable drip ports, basin still (FIG. 6)
45 Drip ports in flow distribution conduit.
46 Flow adjusting screws in saline water inflow distribution conduit.
48a Support brackets for inflow distribution conduit, tilted still.
48b Support brackets for inflow distribution conduit, basin still.
50 Wooden dowel lag screw anchor, typical.
51 Screw to hold wooden dowel in place.
52 Lag screws, typical.
53 Washers for 52.
54 Brackets to secure evaporation chamber to its support base, tilted still (two brackets required—one on each side).
56 Brackets to hang the evaporation chamber and its support base assembly onto the supporting triangular frame (two brackets required one on each side), tilted still.
57 Bolt, washer, and nut assemblies (two) to secure bracket 56 to the support base, tilted still.
60a Left front leg of triangular frame support for tilted still.
60b Right front leg of triangular frame support for tilted still.
60c Left rear leg of triangular frame support for tilted still.

60d Right rear leg of triangular frame support for tilted still.
61 Bolt, with washer and nut assembly, ties together the four legs of the triangular frame.
62 Upper cross member on triangular frame support, tilted still.
62a Bolt, washer and nut assembly to secure upper cross member 62 to legs 60a and 60b.
63 Lower cross member on triangular frame, tilted still.
63a Bolt, washer and nut assembly to secure lower cross member 63 to legs 60a and 60b.
64 Coupling joining saline water tube 86 to inflow distribution conduit 44.
65 Closure cap for saline water inflow distribution conduit.
70 Black, thermally responsive actuating element
72 Black metal sleeve enclosing 70.
73 Screw securing 70 to 72.
74 Base plate for mounting the operating mechanism of the solar actuated valve.
75 Threaded connection securing metal sleeve 72 to base plate 74.
76 Pivoted metal lever.
77 Bolt, washer and nut assembly securing lever 76 to base plate 74.
78 Wing nut for adjusting compression spring 80.
79 Retainer washer for compression spring 80.
80 Compression spring.
81 Bolt, washer and nut assembly holding compression spring 80 to base plate 74.
83 "U" bolt pressure shoe secured to lever 76 by threaded nuts.
86 Resilient flexible tube saline water conduit, an element of the solar actuated valve.
87 Threaded thumb screw for adjusting the temperature at which the solar actuated valve turns on and off.
88 Transparent enclosure for element 70 and sleeve 72.
89 Mounting bracket for solar actuated valve.
90 Reflective surface fastened underneath transparent enclosure 88.
92 End closure cap for 88.
94 Brackets securing transparent enclosure 88 to base plate 74.
100 Waste brine discharge tube, tilted still.
102 Distillate discharge tube, tilted still.
104 Waste brine discharge tube, basin still.
106 Distillate discharge tube, basin still.
108a Elastic members holding the evaporation chamber cover in place, tilted still.
108b Elastic members holding the evaporation chamber cover in place, basin still.
112a Distillate interception trough, tilted still.
112b Distillate interception trough, basin still.
116 Solid metal rod reinforcement member (alternative type of wall reinforcement).
118 Hole threaded to receive machine bolt 120.
120 Machine bolt threaded to fit hole 118, with washer.
122 Solid metal rod reinforcement member (alternative type of wall reinforcement).
124 Rodlike reinforcement member comprised of wood or FRP (fiberglass reinforced plastic) (alternative type of wall reinforcement).
126 Lag screw, with washer.
130 Rodlike reinforcement member comprised of wood or FRP (alternative type of wall reinforcement).
132 Tubular reinforcement member.
134 Tie rod with threaded ends extending from tubular wall reinforcement member.
136 Nut and washer for tie rod 134.
138 Tubular reinforcement member for end wall.
140 Water trays in a tilted tray still, typical.

Descriptions of the Elements in the Drawings, FIGS. 1 to 13

Typical embodiments of my solar actuated automated still are shown by FIG. 1, a perspective view of an assembled tilted still; and FIG. 8, a perspective view of an assembled basin still. Individual components are identified by numerals in Drawings, FIGS. 1 to 13.

In the descriptions of the numbered parts which follow, it should be noted that two types of stills are involved, the tilted still, FIG. 1, 1A, 1B, and the basin still, FIG. 8.

The components of both still types are similar in composition and usage but some have different configurations.

Components for the tilted stills are designated by the first number and, if there is a corresponding component for the basin still, it is designated by a following number in parentheses.

Floor 22a of the tilted wick still and floor 22b of the basin still are similar in construction. Each is comprised of a layer of flexible foam plastic insulating material which forms a continuous flat layer of insulation completely covering the floor area within the enclosing perimeter walls of the evaporation chamber. The floor 22a (22b) and enclosing chamber walls are supported on a flat base 30a (30b) comprised of a sheet of comparatively rigid material, such as plywood.

Rigid foam plastic thermal insulation may be used for the floor of the evaporation chamber if it is divided into several segments. A large sheet of rigid foam plastic warps, when exposed to the heat of the evaporation chamber, and causes humps in the floor of the chamber. If it is divided into segments, the warpage is reduced proportionately so that it does not create excessive unevenness in the floor.

In FIG. 1 (and FIG. 8) the reinforced walls enclosing the evaporation chamber comprise two sidewalls 24a (26a), lower endwall 24b (26b) and upper endwall 24c (26c).

In the preferred embodiment, the wall panels are comprised of rigid foam plastic thermal insulation with tubular metal reinforcement members incorporated internally in the foam plastic panels. The internal reinforcement strengthens the foam plastic to create a strong panel unit which can be used in a chamber structure without requiring rigid backing or double confining surfaces of wood or metal.

Rigid foam plastic thermal insulation sheets which are commercially available are normally faced (surfaced) with aluminum foil. The aluminum foil provides protection against the destructive effects of ultra violet rays when the plastic foam is used for wall panels in a solar still. Reinforcement members are installed to strengthen the foam plastic panels and to prevent them from warping when they are exposed to the internal heat of the still.

Reinforcement also creates a panel unit which can be handled, assembled, and disassembled, and which is strong enough to be incorporated into the basic structure without requiring any external supporting surfaces.

The reinforcement members also provide convenient fastening means for joining the walls together at the corners of the evaporation chamber to create a rigid boxlike structure.

The four walls of each evaporation chamber, FIG. 1; FIG. 8, are fastened together at the corners by means of long wood screws (lag screws) 52, which pass through the end panels and through their tubular metal reinforcement members, and are anchored into short wooden dowels 50, which are driven into the ends of the side panel reinforcement members.

FIG. 5 shows a typical fastening detail. Lag screw 52 passes through hanger bracket 54 and through end panel 24c and its reinforcement member 28c, and is screwed into wooden dowel 50, which is secured by screw 51 to sidewall reinforcement member 28a.

This type of fastening is typical for reinforcement members at the corner join points with the exception that bracket 54 (FIG. 4 and FIG. 5) is installed at only two locations, both at the upper end of the tilted still.

The tubular metal reinforcement members whose end connections are depicted in FIG. 5, are used in the preferred embodiment. However, there are other materials from which comparatively rigid slender elongated reinforcement members can be made. These include wood, and fiberglass reinforced plastic (FRP). In addition, a rodlike reinforcement member could be used rather than a tubular member; that is, the member would be solid rather than hollow.

FIGS. 5A, 5B and 5C show alternative types of reinforcement for rigid foam plastic wall panels.

FIG. 5A shows a solid metal rod 116 and its end connection detail. Hole 118 in the end of rod 116 is threaded to fit machine bolt 120 which passes through a hole in reinforcement rod 122 and is tightened in place to secure the connection.

FIG. 5B shows rodlike reinforcement member 124 comprised of wood or of FRP, and detail of its end connection. Lag screw 126 is screwed into the end of rodlike member 124 to secure the joint. The lag screw passes through rodlike member 130, which reinforces the endwall. FIG. 5C shows tubular reinforcement member 132, through which is passed metal tie rod 134, which projects from both ends of the tube and is threaded on both ends to receive nuts and washers 136.

Tie rod 134 passes through a hole in reinforcement member 138.

Flat support base 30a, FIG. 1, and flat support base 30b, FIG. 8, are comparatively rigid surfaces on which the evaporation chamber floor and walls are supported. The preferred embodiment for the flat support base is a sheet of ⅜ inch plywood.

Two metal hanger brackets 54 slip over the upper edge of flat support base 30a to hold the evaporation chamber to the support base (FIG. 4).

The preferred embodiments for stills of FIG. 1, 1A, 1B, and FIG. 8, comprise panels cut from rigid plastic foam thermal insulation about 50 millimeters (2 inches) thick. The preferred reinforcement members for the walls of the evaporation chamber comprise one-haft inch galvanized steel electrical conduit (EMT).

The reinforcement members may be incorporated into the foam plastic panels by any of three methods: 1. Holes are bored parallel to and between the panel surfaces, and the reinforcement members are forced into the holes. 2. Slots are cut into the edges of the panels, the reinforcement members are laid in the slots, and the slots are backfilled with liquid plastic foam from a squirt can. The liquid foam sets up quickly, bonds well, and is as strong as the original. 3. The reinforcement members are laid in a mold and liquid foam plastic is poured around them in the same way that reinforced concrete slabs are cast.

Flexible composite sheets 40a (40b), lines the interiors of the evaporation chambers of the tilted stills, FIG. 1, FIG. 1A, FIG. 1B, and the basin still, FIG. 8. In the preferred embodiment, impervious composite sheet 40a (40b) is comprised of a layer of metal foil sandwiched between two layers of flexible plastic film, or sheet. Adhesive is applied to the contact surfaces so that the layers bond and serve as a single sheet. The metal foil gives composite sheet 40a (40b) ductility, which aids in forming the sheet to fit the interior contours of the evaporation chamber. Composite sheet 40a (40b) covers the entire interior, the floor, sidewalls, and endwalls. The upper boundary edges of the sheet extend out of the chamber, lap over the tops of the chamber walls, and extend for a short distance down the outsides of the walls. There they are secured to the outside walls by strips of aluminum foil adhesive tape.

Drain tube 100 (104), drains excess saline water from the bottom of the evaporation chamber. It is bonded into composite sheet member lining 40a (40b), by adhesive means.

Transparent flexible plastic cover film 32a (32b), FIG. 1, FIG. 1A, FIG. 1B and FIG. 8, is fastened to and stretched across rectangular cover frame 34 (36). The four boundary edges of plastic cover film 32a (32b), are attached to the four members of rectangular cover frame 34 (36), which, in the preferred embodiment, is comprised of four tubular metal frame members which are held in a rectangular configuration by socket means in corner elbows 38. The sockets permit the tubes to be rotated about their long axes in order to tighten or loosen the tension in plastic cover film 32a (32b). Tubular metal frame members 34 (36) can be secured in any desired rotational position by tightening set screws 39.

The boundary edges of the plastic cover film are fixed to the tubular metal frame members by sprigs of aluminum foil adhesive tape. After an edge is secured with tape it is rolled onto the tubular frame member for about 1½ turns to secure it against slippage.

Many different types of transparent plastic film have been used for still covers. The preferred embodiment comprises one of the fluorinated synthetic polymers such as polyvinylfluoride (PVF), or fluorinated ethylene-propylene (FEP), in thicknesses of about 100 to 125 microns (0.004 to 0.005 inch). These plastics are preferred because of their long term resistance to heat and ultra violet rays, and their imperviousness to salt water corrosion.

Holes 116 in the tubular metal frame members provide a means for rotating the tubes. A large nail may be inserted into a hole as a handle to rotate a tubular member.

In the preferred embodiment, the members of cover frames 34 (36), are comprised of thin-wall metal tubing. This tubing may be either galvanized steel electrical conduit (EMT), or thinwall copper pipe. The corner elbows 38 may be either galvanized steel pipe elbows or copper pipe elbows. If the still is to operate in a very corrosive salt water environment, copper components are preferred.

Cover frame members 34a, b, c, d (36a, b, c, d) could be comprised of solid metal rods rather than metal tubes, although the cover frame would be much heavier if solid frame members were used.

The members of the cover frames could also be comprised of alternative materials such as fiberglass reinforced plastic (FRP) which can be formulated as a comparatively rigid material, and from which tubes or rods can be fabricated to serve as members for cover frames 34 (36).

Cover frame members could also be comprised of rodlike wooden dowels, although they would need to be larger in diameter than the stronger metal components which they would replace.

The cover for the evaporation chamber FIG. 1 (FIG. 8), comprising transparent flexible plastic cover film 32a (32b) and cover frame 34 (36) is held down in tight contact with flexible compressible plastic foam gaskets 41a (41b), located on the planar top surfaces of the walls enclosing the evaporation chamber, by means of tensioned elastic members 108a (108b) which may be either metal springs or elastic cords.

Elastic members 108a (108b) are hooked, at their upper ends, to corner elbows 38 and the lower ends are hooked to the protruding ends of the endwall reinforcing members.

Distillate interception trough 112a (112b), FIGS. 1, 1A, 1B, 3, 8, and 9, is affixed to the undersurface of the plastic cover film 32a (32b) near its lower end, to intercept condensed distillate trickling down the undersurface of the cover film. The distillate collected in the interception trough 112a (112b) is conducted to a container outside the still through discharge tube 102 (106) which is bonded into a lower corner of the interception trough with adhesive.

In the preferred embodiment, the interception trough 112a (112b) is made of plastic film or sheet, and is affixed to the undersurface of cover film 32a (32b) by bonding with an adhesive.

The surfaces of plastic (synthetic polymer) films are typically hydrophobic (water repellant or non-wettable), with the result that distillate condenses on the undersurface of the film as a multitude of tiny spherical droplets which reflect sunlight and give the surface a foggy or frosty appearance. This reflectance prevents some sunlight from entering the still and reduces production.

The present invention discloses fluid hydrophylic mixture 33 which is applied as a thin coating to the undersurface of the plastic cover 32a (32b) to render the surface hydrophylic (wettable), with the result that distillate condensation on the undersurface spreads out into a thin transparent film which remains clear and does not impede the entrance of sunlight into the still.

Hydrophylic mixture 33 comprises a mixture of finely pulverized bentonite clay, activated with acid and mixed with water. Mixture 33 is applied to the undersurface of plastic cover 32a (32b) with a sprayer or a paint brush. About 30 grams (about 1 ounce) of the water mixture 33 is adequate to coat one square meter (about 10.8 square feet) of plastic surface.

The preferred embodiment for hydrophylic mixture 33 comprises finely ground bentonite clay added to an acid-water solution which has a hydrogen ion concentration with a pH reading of less than 2.5. About 1 part, by weight, of bentonite clay, is added to 4 parts, by weight, of the acid-water solution, to give a fluid hydrophylic mixture.

A possible theoretical explanation for the effectiveness of this mixture is that the hydrogen ions in the acid impart electrical charges to the micron size bentonite clay particles and these charges cause the particles to cling, with one charged pole, to a dielectric surface (such as a plastic surface), while the other pole remains free and retains its attraction for water molecules. Thus, a layer of activated bentonite clay a few microns thick causes the formation on the plastic surface of a thin clear film of condensed distillate.

FIG. 12 shows the preferred embodiment of the solar actuated saline water control valve which allows saline water to flow through the still when the sun shines, but stops the saline water flow when the sun ceases to shine. The particular embodiment of the valve shown in FIG. 12 is installed with the thermally responsive actuating element 70, and its enclosing sleeve 72, extending inside the evaporation chamber so that the actuating element 70 reacts to the internal heat of the still.

The solar actuated valve comprises thermally responsive actuating element 70 which is enclosed in snug fitting metal sleeve 72. One end of actuating element 70 is secured to the lower end of its enclosing metal sleeve 72 by screw 73. The top end of actuating element 70 projects from the open top end of metal sleeve 72 and passes through base plate 74 which is rigidly secured, by a threaded connection, to the top end of metal sleeve 72. Actuating element 70 contacts the end of screw 87, which is threaded through lever 76, and transmits force from actuating element 70 to lever 76. Lever 76 is secured, at one end, to base plate 74 by nuts on bolt 77. At its other end lever 76 is forced downward by compression spring 80, so that pressure shoe 83, which is affixed to lever 76 by threaded nuts, exerts pressure on the exterior of resilient flexible tube 86, which is the conduit for saline water flowing to the still. Compression spring 80 is held in place by threaded bolt 81, retaining washer 79, and wing nut 78.

Normally, the force of compression spring 80, transmitted through lever 76 and pressure shoe 83, compresses the resilient flexible tube 86 sufficiently to close its interior water passage and prevent the flow of saline water to the still. When an ambient temperature increase causes the expansion of actuating element 70, its motion is transmitted to lever 76, which reduces pressure on tube 86 which expands to allow saline water to flow to the still.

FIG. 12B shows an alternative embodiment of the solar actuated saline water control valve which is depicted in FIG. 12. This alternative embodiment utilizes the same operating mechanism shown in FIG. 12 and described in the preceding paragraphs; however, transparent sleeve 88 is added to serve as a wind screen for actuating element 70 and metal sleeve 72. In addition, curved solar reflecting surface 90 is affixed on the exterior of the bottom of transparent sleeve 88 to concentrate more solar energy on the actuating element 70 in order to expedite the actuation of the valve.

The embodiment shown in FIG. 12B is preferred when the solar actuated valve is installed outside the evaporation chamber. The valve is attached to metal bracket 89, which is secured to the upper end of the evaporation chamber by lag screws 52, FIG. 13, which positions the valve so that actuating element and sleeve 70, 72, are fully exposed to the sun. Transparent enclosure 88 serves to reduce heat loss to the atmosphere and to conserve solar heat around actuating element 70.

The preferred embodiment of the solar actuated saline water control valve, FIG. 12, utilizes a black plastic (synthetic polymer) rod 70 enclosed in a copper sleeve 72, painted black. Base plate 74 is a glass-fiber-reinforced synthetic polymer plate. Lever 76 and the various bolts, nuts, washer, and screws of items 77, 78, 79, 80, 82, 84, 87, are comprised of brass for corrosion resistance.

Wick matting (absorber/evaporator matting) 42a (42b) covers the bottom of the evaporation chamber and provides a water absorbent layer which spreads the saline water in a thin even layer over the bottom surface. Wick matting also provides a black surface to absorb solar energy and a rough, water saturated, surface from which evaporation takes place.

My solar actuated, automated still utilizes wick matting made of glass fibers. These inorganic amorphous silicate fibers are unaffected by ultra violet rays or the internal heat of the still and are very resistant to the chemical effects of hot salt water.

The glass fibers most suitable for wick matting are those sold commercially for thermal insulation. Some, for insulating ceilings, are sold in board-like panels. Others, for insulating ceilings, walls, or floors, have a wool-like texture and are sold in pads, "bats", or rolls.

The preferred embodiment comprises glass fiber matting which has the feel and consistency of sheep's wool and consists of a thick layer of fine, short, randomly arrayed fibers, which are evenly distributed throughout the thickness of the matting. Generally, most of the fibers should have average diameters of less than about 10 to 15 microns. When a "bat" of this glass "wool" is compacted to give a matrix which has a unit volume density equivalent to about 0.02 to 0.04 grams per cubic centimeter (3 to 6 pounds per cubic foot), many points of contact are created and many capillary passages for water are created. For a tilted wick still, the thickness of the wick matting may be about 10 to 15 millimeters (about ⅜ to ⅝ inch) for the best absorption/evaporation characteristics. A thickness of about 15 to 25 millimeters is suitable for a basin still which has a flat bottom and retains a greater depth of water.

Some types of commercial glass fibers are not suitable for making wick matting. Glass cloth, for example, is comprised of twisted strands of glass fibers which are oriented rather than being random in arrangement so that random capillary channels for water are not created and the material is not absorbent.

Fiberglass roving has a similar fault. It is commonly used, with epoxy, for fabricating boat hulls, hot tubs, etc. The fibrous strands are relatively hard and incompressible and are not satisfactory for creating an absorbent matting material.

Hydrophylic mixture 43 is applied to the wick matting 42a (42b) to give it a permanent black color and to improve its water absorbency. Mixture 43 is comprised of acid, water, bentonite clay, and lampblack. The lampblack adheres to the glass fibers and creates a black mat surface which is not affected by ultra violet rays or hot saline water and remains permanently black. The liquid mixture is worked into the matting to a depth of about 10 to 15 millimeters.

The preferred embodiment for hydrophylic fluid mixture 43 comprises (by weight) 25 parts of finely ground bentonite clay and about 4 parts of lampblack mixed into 100 parts of an acid-water solution which has a hydrogen ion concentration with a pH reading of less than 3.

For a stiff wick matting, which will be self supporting on a steep slope, sodium silicate solution (40° Baume) may be added to the above described mixture in the amount of about 20 parts per 100 parts of the hydrophylic mixture.

If the still is comprised as a tilted tray still, the wick matting is not required, and is replaced by a rack of transversely level water trays resting on the floor of the evaporation chamber. Saline water fed into the top tray overflows into each successively lower tray until any unevaporated saline water is discharged as wastewater at the bottom of the evaporation chamber.

Saline water inflow distribution conduit (FIG. 6) is supported in the upper portion of the evaporation chamber by two brackets 48a (48b). The support brackets comprise threaded bolts with hooked ends extending through endwalls 24e, FIG. 1; and 26c, FIG. 8, and secured by nuts and washers installed on both sides of the endwalls to clamp the support brackets in position.

The saline water inflow distribution conduit, FIG. 6, comprises conduit 44a (44b), closed at one end by cap 65 and connected at the other end by coupling 64 to resilient flexible tube 86, which is an element of solar actuated valve, FIG. 12. Conduit 44a (41b) is perforated by a series of small holes (drip ports) 45, in a line along one side, through which saline water drips into the evaporation chamber. Into each drip port 45 is turned threaded screw 46, on one side of which is a flat, tapered surface. By turning each screw in or out, the rate of flow from each port is regulated so that uniform distribution of saline water across the width of the still is achieved.

The preferred embodiment for inflow distribution conduit 44 is a length of plastic pipe with a line of holes (drip ports, spaced 75 to 100 millimeters (3 to 4 inches) apart, drilled along one side. A threaded screw (wood screw, or similar type screw) with a tapered flat surface on one side, is turned into each of the drip ports. The screws are preferably comprised of stainless steel or brass for corrosion resistance.

Flat support base 30a, which supports the evaporation chamber of the tilted still, FIG. 1, is in turn supported on triangular frame 60, which is adjustable for inclination. Triangular frame legs 60a, 60b, 60c and 60d, are comprised of metal tubes which converge to a junction at the top of the frame and meet in a configuration which allows a single bolt 61 to be passed through holes in the top of each leg to tie all four legs together. Triangular support frame upper cross member 62, and lower cross member 63, are fastened to legs 60a and 60b by bolt, washer and nut assemblies 62a and 63a respectively. Cross members 62 and 63 serve to tie the two front legs together to create a rigid triangular support frame.

Cross members 62 and 63 are the support for flat support base 30a, which supports the evaporation chamber, FIG. 1, 1A, 1B. The evaporation chamber assembly is attached to the triangular support frame by means of two hanger brackets 56 (one on each side) which hook over upper cross member 62 (FIG. 4) and "hang" the still assembly to the triangular support frame. Hanger brackets 56 are attached to the flat support base by bolt, washer and nut assemblies 57.

The evaporation chamber assembly can be easily removed from its support frame by lifting it until hanger brackets 56 are disengaged.

Description of Still Operation

The saline water to be distilled passes through resilient flexible tube 86 which is an element of solar actuated water control valve, FIG. 12 and 12B.

The normal mode for the valve is the closed mode because sunlight is available for, at the most, about 7 to 10 hours out of every 24 hour period, depending on the season, the latitude, and the weather. Therefore, solar energy sufficient for the distillation process will be available for less than one-third of the 24-hour day.

When the temperature of thermally responsive actuating element 70 is increased, either by direct sunlight or by solar heating of the surrounding air, element 70 expands longitudinally and exerts force, through adjusting screw 87, on lever 76. Lever 76 lifts attached pressure shoe 83 from resilient flexible tube 86 and the decreased pressure on tube 86 allows the tube to expand, and its internal passage to open, and saline water to flow through tube 86 and into saline water distribution conduit 44a (44b). Thence, the saline water passes through drip ports 45 and drips onto wick matting 42 in the bottom of the evaporation chamber.

Saline water is absorbed by, and spreads through, black wick matting 42a (42b), which absorbs solar energy entering the still through transparent flexible plastic cover film 32a (32b).

If the still is a tilted tray still, FIG. 1B, the entering saline water drips directly into the end of the topmost tray, and distribution conduit 44a is not required. A portion of water is evaporated from each tray, and surplus water overflows into each successively lower tray until, at the bottom, it is discharged through tube 100.

Solar heat evaporates water from the wick matting or from trays and water vapor rises and condenses on the undersurface of plastic cover film 32a (32b) to which hydrophylic mixture 33 has been applied to render the undersurface wettable. The condensed droplets spread out to form a thin clear film of condensate which trickles down the undersurface of the sloping cover film and is intercepted by trough 112a (112b) which is affixed to the undersurface of cover film 32a (32b). From the bottom of trough 112a (112b)

distillate flows out of the still through flexible tube 102 (106) which is bonded into a lower corner of trough 112a (112b). When the sun sets, or when the sun is obscured by clouds, thermally responsive actuating element 70, contracts longitudinally and lessens the force transmitted to lever 76 through adjusting screw 87. This allows the counter force of compression spring 80 to move lever 76 and attached pressure shoe 83 downward against flexible tube 86, compressing the tube and closing its interior passage to stop the flow of water into the still.

Excess water which flows into the still, and is not evaporated, is discharged through flexible tube 100 (104) which is adhesively bonded into a lower corner of impervious sheet evaporation chamber lining 40a (40b).

Adjusting screw 87 may be turned to set the solar actuated valve to open and close at any desired temperature. By turning adjusting screw 87 in, to exert more pressure on the end of actuating element 70, the valve opens when the ambient temperature is low, and by turning adjusting screw 87 out, to exert less pressure on element 70, the valve opens at a higher ambient temperature.

Adjustment nut 78 is used to adjust the compression of spring 80 which provides the force for compressing tube 86 to stop the flow of saline water.

It should be noted that the two embodiments of the solar actuated saline water control valve depicted in FIG. 12 and FIG. 12B acquire their actuating heat differently. Both embodiments have as an actuating element, a black plastic rod 70, but the embodiment shown in FIG. 12 has no protective transparent enclosure around actuating element 70 and sleeve 72. This embodiment is installed with its actuating element 70 and metal sleeve 72 extending inside the evaporating chamber and is actuated by the temperature regime inside the chamber. This embodiment is preferred for installation in basin type stills because there is an excess of interior space available in such stills.

The alternate embodiment, FIG. 12B, is provided with a transparent enclosure 88 surrounding actuating element 70 and sleeve 72, for the purpose of retaining solar heat adjacent to the actuating element.

Curved reflecting surface 90 is fixed in place underneath transparent tubular enclosure 88 to collect additional solar energy and reflect it back onto actuating element 70. The purpose is to expedite the valve action. This embodiment, FIG. 12B, is preferred for installation with tilted type stills, and is installed outside the still in a location where the actuating element is fully exposed to the sun.

Summary, Ramifications, and Scope

In summary, the reader will see that my sun actuated automated distillation apparatus is an improvement over the previous practice of the art. It incorporates improvements in all the major components required for efficient use of solar energy for production of distilled water.

A solar still is comprised of a number of functional elements, each of which can vary in its concept. My sun actuated automated still utilizes new and novel concepts and combinations of materials for all the elements required for a functional solar still.

The use of plastics in novel combinations with metallic elements allows structures to be fabricated with a minimum of material, and with each material used to take maximum advantage of its best qualities.

My sun actuated automated still is simple in design, economical to construct, light weight and portable, and easily maintained.

Only four pre-fabricated reinforced insulation panels are required for the enclosing walls of the evaporation chamber and the floor of the chamber is comprised of flexible plastic foam thermal insulation. The evaporation chamber is assembled by installing two lag screws in each corner of the "box", and is disassembled by removing these screws.

The transparent cover and its frame for the evaporation chamber can be disassembled and rolled up by loosening the set screws in the corner elbows, removing the upper and lower frame members, and rolling the cover film around the two side frame members.

The wick matting, comprised of glass fibers, and impregnated with a black hydrophylic mixture, has a long service life and a permanent black color. It can be rolled up for convenience in transportation.

The components of the still, when disassembled, can be packed in parcels small enough to be shipped by normal parcel services.

My sun actuated automated still can be set up and connected to a continuous supply of impure water and will operate without attention for long periods of time, producing a daily portion of potable water which can be accumulated in a storage tank.

The still can be set up in a relatively small back yard or in a large patio. It can be set up on a special support frame, or it can be "leaned" against the south facing wall of a house, garage, or other building. It can also be supported by leaning against a fence. Since it is lightweight, it can also be mounted on a roof.

Additional Ramifications

Although the descriptions hereinbefore given contain many specificities, these should not be construed as limiting the scope of the invention but merely as providing illustrations of some of the presently preferred embodiments of my sun actuated automated distillation apparatus.

For example, in the preferred embodiment, tubular metal members are used as internal reinforcement means for the wall panels of the evaporation chamber.

These reinforcement members could, alternatively, be comprised of materials such as wood or fiberglass-reinforced plastic (FRP). These materials are relatively rigid and can be made into long round dowels, rods, or tubes, which would serve as internal reinforcement members in the rigid plastic foam wall panels.

Similarly, metal tubes are the preferred embodiment for the members of the cover frame for the plastic film cover for the evaporation chamber. These frame members could, as alternatives, be comprised of other materials such as wood or FRP.

A preferred embodiment of the hydrophylic mixture applied to the plastic cover film as been previously described, but, without doubt, there are many variations in the relative proportions of the constituents described which will result in mixtures which give satisfactory results when applied to the still cover film.

The same is true for the preferred formulation for the black liquid mixture applied to the wick matting to make it more absorbent and to give it a permanent black color. There are, doubtless, many variations in the proportions of the ingredients described which will result in mixtures which give satisfactory results when applied to the wick matting.

Thus, the scope of the invention should be determined by the appended claims and their legal equivalents, rather than by the examples given.

What is claimed is:

1. A solar distillation apparatus comprising an evaporation chamber comprised of panels of rigid plastic foam thermal insulation stiffened by means of tubular metal reinforcement members incorporated internally in the panels for maintaining perimeter wall panels as flat, planar, members, and for creating rigid structural panel units which can be incorporated into the evaporation chamber without requiring external support or containing walls wherein the perimeter wall panels enclose a floor of thermal insulation material which completely covers a floor area within the perimeter walls of the evaporation chamber and wherein the floor and walls of the evaporation chamber are supported on a substantially rigid, flat, support base, an impervious flexible sheet for lining the interior of the floor and walls of the evaporation chamber comprises alternate layers of plastic film or sheet, and metal foil, to which adhesive is applied so that the layers bond together and form a single composite sheet which is impervious to saline water and water vapor, a sloping transparent evaporation chamber cover comprises a sheet of transparent flexible plastic film which is attached to, and stretched across, an open rectangular frame comprised of tubular metallic members held in rectangular configuration by sockets in rigid corner elbows, said tubular metallic members individually rotate about their long axes to adjust tension in the plastic cover film to compensate for temperature or wind effects, wherein the cover is held down and in position on top of the evaporation chamber by a tensional pull of elastic members attached at each corner of the cover frame, and wherein a sealed linear join surface is created where the undersurface of the plastic cover film contacts and compresses strips of flexible plastic foam gasket material bonded to planar top surfaces of the walls enclosing the evaporation chamber, a black, absorbent, wick matting disposed on the evaporation chamber floor, comprises a layered mat of fine, randomly arrayed, glass fibers derived from inorganic, amorphous, mineral silicates, said wick matting is impregnated with a hydrophylic mixture comprising a clay mineral activated with acid, and water and lampblack, rendering said wick matting an efficient absorber of water, and of solar energy, and an adjustable, sun actuated, mechanical valve for controlling the flow of saline water into the evaporation chamber, comprises a thermally responsive actuating element fully exposed to radiant solar energy, said actuating element is coupled, by contact with an adjusting screw, to a spring tensioned pivoted lever means, which maintains pressure on a resilient tube saline water conduit, wherein temperature induced dimensional changes in the thermally responsive actuating element are transmitted, as movement, to said pivoted lever means, varying the pressure on the resilient tube saline water conduit, changing its internal dimensions, and controlling the flow of saline water into the evaporation chamber to a desired rate.

2. The solar distillation apparatus as defined in claim 1, wherein the glass fibers have diameters less than 10 to 15 microns, the wick matting having a unit volume density of about 0.02 to 0.04 grams per cubic centimeter.

3. The solar distillation apparatus as defined in claim 1, wherein the hydrophylic mixture comprises, by weight, about 25 parts of finely pulverized bentonite clay, and about 4 parts of lampblack, mixed into about 100 parts of a solution of acid in water, said solution having a hydrogen ion concentration with a pH reading less than 3.0.

\* \* \* \* \*